United States Patent
Stefani et al.

(10) Patent No.: US 7,636,739 B2
(45) Date of Patent: Dec. 22, 2009

(54) METHOD FOR EFFICIENT MAINTENANCE OF XML INDEXES

(75) Inventors: Stefano Stefani, Seattle, WA (US);
Denis V. Churin, Sammamish, WA (US); Istvan Cseri, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 297 days.

(21) Appl. No.: 11/171,769

(22) Filed: Jun. 30, 2005

(65) Prior Publication Data

US 2007/0005632 A1  Jan. 4, 2007

(51) Int. Cl.
*G06F 17/30* (2006.01)
(52) U.S. Cl. .......................... 707/201; 707/3; 715/234
(58) Field of Classification Search .................. 707/204, 707/3, 4, 201; 715/500, 530, 513, 234
See application file for complete search history.

(56) References Cited

U.S. PATENT DOCUMENTS

| | | | |
|---|---|---|---|
| 6,889,226 B2 | 5/2005 | O'Neil et al. .............. 707/100 |
| 6,892,210 B1 * | 5/2005 | Erickson et al. ............. 707/201 |
| 2002/0133484 A1 * | 9/2002 | Chau et al. ..................... 707/3 |
| 2004/0034616 A1 * | 2/2004 | Witkowski et al. ............. 707/1 |
| 2004/0044959 A1 * | 3/2004 | Shanmugasundaram et al. . 715/513 |
| 2005/0165866 A1 * | 7/2005 | Bohannon et al. ........... 707/203 |
| 2005/0223325 A1 * | 10/2005 | Naitou ....................... 715/530 |
| 2005/0228786 A1 * | 10/2005 | Murthy et al. ................. 707/3 |
| 2007/0192348 A1 * | 8/2007 | Brodersen et al. ........... 707/102 |

* cited by examiner

*Primary Examiner*—Hosain T Alam
*Assistant Examiner*—Amy Ng
(74) *Attorney, Agent, or Firm*—Woodcock Washburn LLP (57) ABSTRACT

An update to a primary table is received. The primary table is read to determine the set of rows to be updated. The primary table is updated and XML objects stored in XML columns are overwritten according to the update. A pre-update node table comprising the nodes corresponding to the updated rows is created from an XML index table corresponding to the primary table. A post-update node table is created by shredding the updated XML objects. The post-update table and the pre-update table are merged according to their node identifiers. The resulting merged table can be inspected to determine which nodes have been, added, deleted, or updated. Based on this inspection, the necessary additions and deletions can be efficiently made to the XML index table.

12 Claims, 7 Drawing Sheets

Shredded Representation of Pre Update XML Object

| Node ID | Name | Type | Value |
|---|---|---|---|
| 1 | Book | Element | |
| 1.0.1 | ISBN | Attrbute | 1-55860-190-2 |
| 1.0.3 | Year | Attribute | 1993 |
| 1.3 | Author | Element | |
| 1.3.1 | | Text | Jim Gray |

FIG 3a

Shredded Representation of Post Update XML Object

| Node ID | Name | Type | Value |
|---|---|---|---|
| 1 | Book | Element | |
| 1.0.1 | ISBN | Attrbute | 1-55860-190-2 |
| 1.0.3 | Year | Attribute | 1993 |
| 1.3 | Author | Element | |
| 1.3.1 | | Text | Jim Gray |
| 1.5 | Author | Element | |
| 1.5.1 | | Text | Andreas Reuter |

FIG 3b

| Probe | Node ID | Name | Type | Value |
|---|---|---|---|---|
| 1 | 1 | Book | Element | |
| 1 | 1.0.1 | ISBN | Attribute | 1-55860-190-2 |
| 1 | 1.0.3 | Year | Attribute | 1993 |
| 1 | ... | ... | ... | ... |
| 1 | 1.5 | Author | Element | |
| 1 | 1.5.1 | | Text | Andreas Reuter |

| Probe | Node ID | Name | Type | Value |
|---|---|---|---|---|
| 1 | 1 | Book | Element | |
| 1 | 1.0.1 | ISBN | Attribute | 1-55860-190-2 |
| 1 | 1.0.3 | Year | Attribute | 1993 |
| 1 | | ... | ... | ... |

FIG 3c

| Action | Probe | Node ID | Name | Type | Value | Probe | Node ID | Name | Type | Value |
|---|---|---|---|---|---|---|---|---|---|---|
| Update | 1 | 1 | Book | Element |  | 1 | 1 | Book | Element |  |
| Update | 1 | 1.0.1 | ISBN | Attrbute | 1-55860-190-2 | 1 | 1.0.1 | ISBN | Attrbute | 1-55860-190-2 |
| Update | 1 | ... | ... | ... | ... | 1 | ... | ... | ... | ... |
| Insert | Null | Null | Null | Null | Null | 1 | 1.5 | Author | Element |  |
| Insert | Null | Null | Null | Null | Null | 1 | 1.5.1 |  | Text | Andreas Reuter |

FIG 3d

| Node ID | Name | Type | Value |
|---|---|---|---|
| 1.5 | Author | Element |  |
| 1.5.1 |  | Text | Andreas Reuter |

METHOD FOR EFFICIENT MAINTENANCE OF XML INDEXES

BACKGROUND

The eXtensible Markup Language (XML) is a World Wide Web Consortium (W3C) endorsed standard for document and data representation that provides a generic syntax to mark up data with human-readable tags. XML does not have a fixed set of tags and thus allows users to define such tags as long as they conform to the XML standard. Data may be stored in XML documents as strings of text that are surrounded by text markup. The W3C has codified XML's abstract data model in a specification called the XML information set (XML Infoset). XML Schemas also may be used to apply a structure to the XML format and content. In the case of an XML Schema, a diagram, plan, or framework for XML data in a document may be defined. Although XML is a well-known format that may easily describe the contents of a document, other non-XML formatted data may be desirable in the same database.

Search engines on relational databases are well-known. A typical standard is the Structured Query Language (SQL) relational database language. Both XML coded and SQL data may be placed in a single database to indicate some data relationship. However, the search of that database may become difficult because the XML values stored in the rows of the SQL database may appear as large objects expressed in text or binary form. Although the SQL relational database information may be fast and efficient, searching the large objects in the XML coded information of the relational database may be inefficient. Typically, the inefficiency results from the excessive time and computer resource consumption involved in opening and examining of the XML coded large objects every time XML data is accessed in the SQL database.

Solutions to this problem include generating an XML index from a "shredded" representation of the XML column from the SQL database. A separate row in the XML index is created for each node (e.g. element or tag) in an XML object. Each row in the XML index contains, among the other columns, the primary key of the primary table associated with the XML object, a node identifier, and the contents of the node itself. The primary key of the XML index is made of the primary key and the node identifier, for example Because of the one-to-many relationship between rows in the primary table and the XML index, the cost of propagating the changes from the base table to (i.e. maintaining) the XML index can be very costly. Updating a single XML column in a single primary table row can result in massive changes to the contents of the XML index.

When a user makes a change to an XML object in the primary table, current implementations first delete all the corresponding rows in the XML index, and then compute the shredded representation of the new value, and insert in the XML index the result of the computation. This results in deleting first and inserting next all the corresponding rows in the XML index, regardless of whether those particular rows actually changed. A typical user modifies only a small number of nodes inside of a bigger XML object. As a result, many rows are needlessly updated resulting in the inefficient use of processing power.

Therefore, what are needed are systems and methods for identifying which rows in an XML index require updating as a result of an update to a primary table involving an XML object.

SUMMARY

An update to a primary table is received. The primary table is read to determine the set of rows to be updated. The primary table is updated and XML objects stored in XML columns are overwritten according to the update. A work table is created comprising the primary key and XML column of updated rows from the primary table. A data stream containing the pre-update node table is created by reading the XML index table rows corresponding to the updated XML objects. A data stream with the post-update node table is created by shredding the XML objects comprised in the work table. The post-update table and the pre-update table are merged according to their node identifiers. The resulting merged table can be inspected to determine which nodes have been, added, deleted, or updated. Based on this inspection, the necessary additions, deletions, or updates can be efficiently made to the XML index table.

While the invention is described in terms of XML objects and XML indexes, it is not meant to limit the invention to XML objects. The invention is generally applicable to any form of secondary index or materialized view whose rows have a many to one relationship with the base table column values they are defined on.

DETAILED DESCRIPTION

Figure 1:
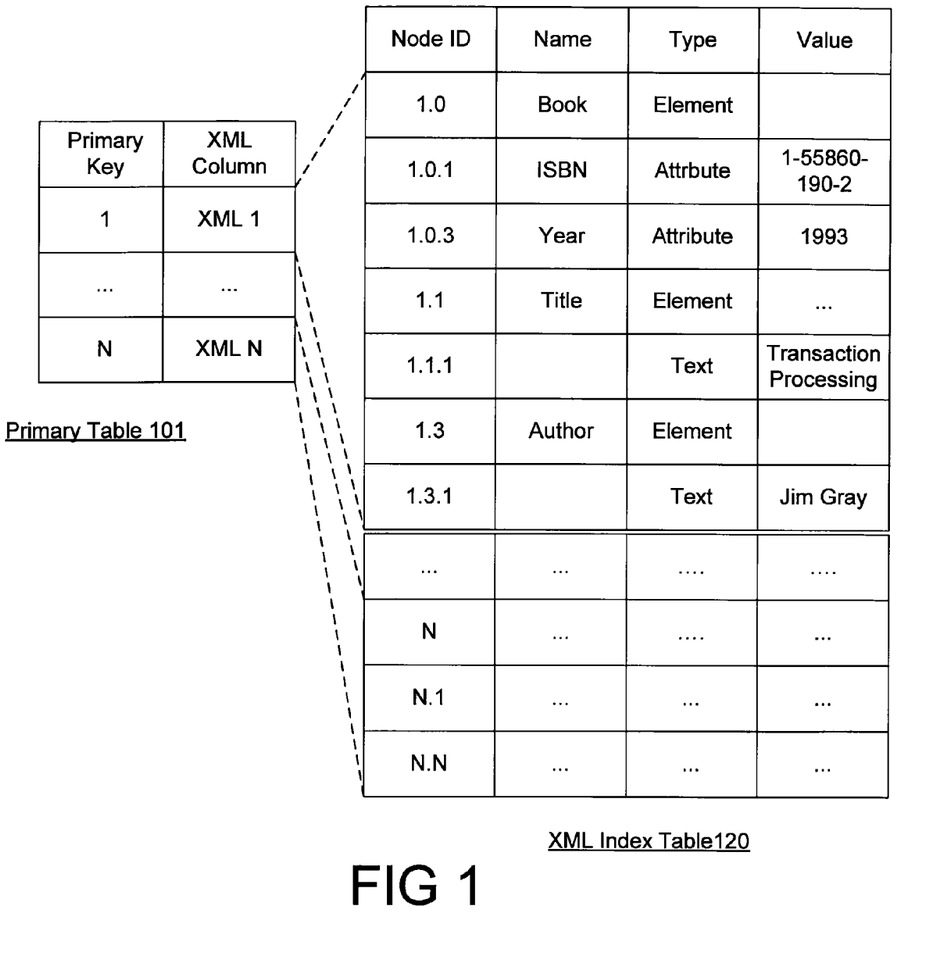
FIG. 1 is a diagram of an exemplary database including an XML index in accordance with the invention.

FIG. 1 is a block diagram of an exemplary database including a primary table 101 and an XML index table 120. The primary table 101 may comprise a plurality of rows and columns. As shown, the primary table contains two columns, the primary key column, and an XML column. However, there is no limit to the number of columns that can be supported by the primary table 101.

The primary key column is used to uniquely number, or index, row entries in the primary table 101. Accordingly, each primary key value in successive rows is unique. As shown, there is no limit to the number of rows that may be supported in the primary table 101.

The XML column stores an object of type XML. Each XML object may comprise a plurality of nodes, with each node comprising data or additional nodes or sub nodes, for example. Because the XML object type is flexible, each XML object may comprise a wide variety of different nodes. A node may have a node name, node type, and a node value.

For example, consider the following simplified XML object, representing a book:
<Book @ISBN="1-55860-190-2"@year="1993"> <Title>Transaction Processing: concepts and techniques</Title> <Author>Jim Gray</Author> </Book>

The XML object comprises a book node including an ISBN number and a publication year. In addition, the book node comprises a title sub node and an author sub node, each with their respective values.

Because the XML objects may comprise a variety of nodes of a variety of types, it is difficult to efficiently search XML objects stored in the primary table 101. For example, if a user desired to retrieve all book objects in the XML column authored by Jim Gray, the XML objects would be retrieved, the objects would be searched for an author column, and finally the author columns would be matched against the listed authors.

To facilitate more efficient data searching, an XML Index table 120 is desirably created by shredding the XML objects in the primary table 101. The XML index table 120 may be shredded by extracting nodes and sub nodes from the XML objects in the primary table 101, and creating a row entry for the extracted nodes and sub nodes, for example. The row entry may comprise a node identifier, node name, node type, node value and any other data typically associated with a node, for example. While the XML index table 120 illustrated in FIG. 1 contains only four columns, it is for illustrative purposes only and not meant to limit the invention to four columns. There is no limit to the number of columns that can be supported.

As each node row entry is created, the node identifier may also be created. The node identifier is a unique identifier of the particular node or sub node, as well as the XML object that the node belongs to. The node identifier may be created by combining the primary key associated with the particular XML object in the primary table 101, with the relative position of the node in the XML object, for example. In addition, each sub node may be numbered relative to its parent node. The nodes may be numbered such that subsequent nodes are binary ordered with respect to the previous nodes, as described in U.S. Pat. No. 6,889,226, titled "System and Method for Relational Representation of Hierarchical Data", for example. However, any system, method, or technique known in the art for node numbering may be used.

For example, assume XML object 1 corresponds to the XML object described above. When the XML object is shredded to create the XML index table 120 seven row entries are created. The row entries corresponding to XML object 1 are assigned a node identifier with the prefix '1' indicating that these nodes are comprised within the XML object associated with the primary key '1'. Similarly, the row entries corresponding to XML object N are assigned node identifiers beginning with the prefix 'N' indicating that the nodes are comprised within the XML object associated with the primary key 'N'.

Further, sub nodes may be numbered to indicate that they belong to, or are a child of, a parent node. For example, node 1.0 has two sub nodes numbed 1.0.1 and 1.0.3. Sub node 1.0.1 contains an ISBN number that uniquely identifies the parent book node, and sub node 1.0.3 contains the year the book was published, for example. Similarly, title node 1.1 comprises a sub node 1.1.1 containing the book title, and author node 1.3 comprises a sub node 1.3.1 containing the book author's name, for example.

While using the XML index table 120 increases the efficiency of queries on XML objects, it also introduces additional complexities to updating the database. As shown in FIG. 1, entries in the primary table 101 may have several corresponding entries in the XML index table 120. Therefore, an update to one or more rows in the primary table 101 may require the update of a large number of rows in the XML index table 120. However, updates to the primary table 101 are often small and may only require the updating of a few nodes in the XML index Table 120. To avoid updating rows in the XML index table 120 that are unchanged by an update to the primary table 101, the updates are desirably made using the method described below with respect to FIG. 2.

Figure 2:
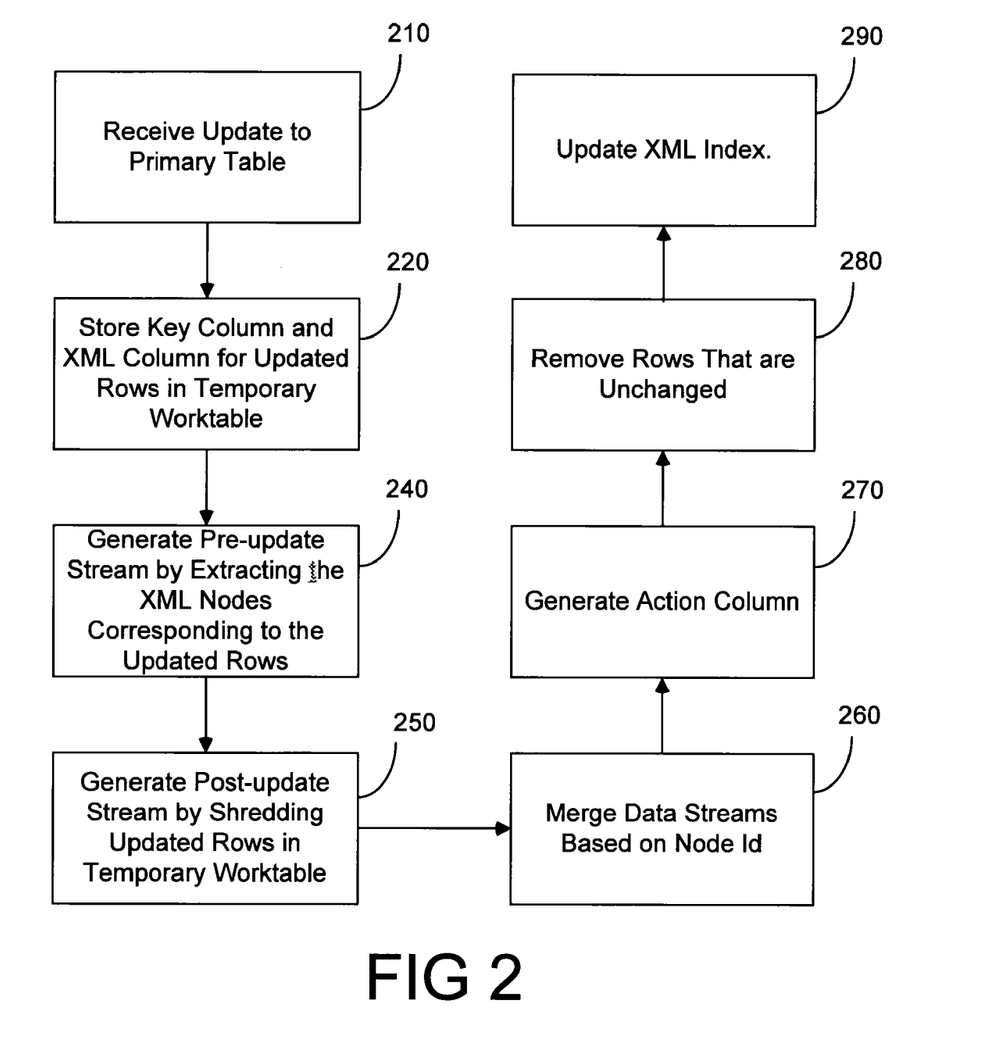
FIG. 2 is a flow diagram illustrating an exemplary method for updating an XML index in accordance with the invention.

FIG. 2 is a flow diagram illustrating an exemplary method of updating an XML index table in accordance with the invention. An update to a primary table is received. The primary table is read to determine the set of rows to be updated. The primary table is updated and XML objects stored in XML columns are overwritten according to the update. A work table is created comprising the primary key and XML column of the updated rows from the primary table. A data stream containing the pre-update node table comprising the nodes corresponding to the updated rows is created by reading the XML index table. A data stream with the post-update node table is created by shredding the XML objects comprised in the work table. The post-update table and the pre-update table are merged according to their node identifiers. The resulting merged table can be inspected to determine which nodes have been, added, deleted, or updated. Based on this inspection, the necessary additions, deletions, and updates can be efficiently made to the XML index table. While the following Figure is described with respect to XML objects and XML indexes, it is for illustrative purposes only, and not meant to limit the invention to XML objects or XML indexes. The invention is applicable to any form of secondary index or materialized view whose rows have a many to one relationship with the base table column values they are defined on.

At 210, an update is received to a primary table. The primary table may contain one or more XML columns. The primary table may be similar to the primary table 101 shown in FIG. 1, for example. The primary table desirably comprises a column containing a primary key, and an XML object column comprising XML objects.

The primary table is desirably locked and read to determine the rows that will be updated as a result of the received update. The primary table is then updated, including the XML objects. Any system, method, or technique for updating a table known in the art may be used.

At 220, a temporary work table may be created. The work table desirably comprises the XML column and primary key column from the updated rows in the primary table. The values in the work table desirably correspond to the post-update values of the primary table. Any system, method, or technique known in the art for generating a table can be used.

At 240, a data stream containing the pre-update node table is desirably created. The pre-update node table may be created by retrieving the row entries in the XML index table for nodes associated with the primary key of the rows from the primary table that were updated. For example, if row 1 of the primary table was updated, then nodes with a node identifier associated with row 1 are desirably retrieved from the XML index table and added to the pre-update node table. Because the primary table was locked at 210, and concurrent updates will maintain the primary table first as well, it is not necessary to lock the corresponding XML index table. Locking the primary table ensures that no concurrent transaction will modify the rows being read from the corresponding XML index table.

Another possible method to generate the pre-update data stream is to save the pre-update value of the primary table XML column to a memory buffer, and shred it rather than reading from the XML index. Which method is used depends on the typical size of the XML column, the number of rows in the shredded representation, the columns the XML index is sorted on, and the number of rows in the XML index that need to be updated, for example.

In addition, a probe column may be designated or added to the pre-update node table. The designated probe column can be any column whose value can be guaranteed to be non-Null. A dedicated probe column may alternatively be added to the pre-update table and populated with any values, so long as the values are non-Null. For example, rows in the probe column may be set to '1'. The probe column is described further with respect to the merge operation at 260.

At 250, a post-update node table is desirably created. The post-update node table may be created by shredding the XML objects added to the primary table during the update. These XML objects may be found in the work table, generated at 220 for example. Similarly to the pre-update node table, a probe column may be designated or added to the post-update node table.

At 260, a full outer merge operation is desirably performed on the post-update node table and the pre-update node table based on the node identifiers. As a result, a merged table will be formed. The merged table comprises one row entry for node identifiers found in either the pre-update node table, or the post-update node table. Rows in the merged table desirably contain columns from the post-update node table, representing the node after the update, and columns from the pre-update node table, representing the node before the update, for example.

If a particular node was deleted as a result of the primary table update, the row entry in the merged table corresponding to that node may have Null values in the columns from the post-update table, including the probe column. Because the node was deleted, it was not included in the post-update table. Because the node appeared in the pre-update table, it was added to the merged table. However, because there was no corresponding node in the post-update table, and an outer join operation was performed to merge the tables, Null values were added instead of columns from the post-update table.

Similarly, if a particular node was added as a result of the primary table update, the row entry in the merged table corresponding to that node may have Null values in the columns from the pre-update table, including the probe column. Because the node was added, it was not included in the pre-update table. Because the node appeared in the post-update table, it was added to the merged table. However, because there was no corresponding node in the pre-update table, and an outer join operation was performed to merge the tables, Null values were added instead of columns from the pre-update table As described above, the probe column, whether added or designated, desirably contains a non-Null value. Therefore, the addition or deletion of a node can be easily detected by testing the probe column associated with that node. If a Null value is detected then the node was either added or deleted.

At 270, the two probe columns may be used to generate a new column called action, for example. The action column may contain an indicator of what action should be taken for the associated node to maintain the XML index. The probe columns for the nodes in the merged table are examined. If both probe columns are non-Null, then the node was present in both the pre and post-update tables. Accordingly, the action column may be marked to indicate that the XML index table can be maintained with an in place update for the node. The column may be marked by inserting the word 'update', for example. Alternatively, an integer value representing the action to be taken may be used to mark the column. Any system, method, or technique known in the art may be used.

If the probe column associated with the pre-update table is Null, and the probe column associated with the post-update table is non-Null, then the action column may be marked to indicate that the node should be inserted into the XML index in order to maintain the index. The column may be marked by inserting the word 'insert', for example If the probe column associated with the post-update table is Null, and the probe column associated with the pre-update table is non-Null, then the action column may be marked to indicate that the node should be deleted from the XML index in order to maintain the index. The column may be marked by inserting the word 'delete', for example At 280, the rows in the merged table whose action column entry indicates that an update may be performed are further examined to determine if there has been an actual change to any of the columns in the node. For these nodes, the pre and post-update column values are desirably compared. If a particular pre and post-update column do not match, then that node may have actually changed and the update may be required. However, if all of the pre and post-update columns are equal, then there was no change made to the node. Accordingly, the node row entry in the merged table may be removed because the node has not changed.

An optimization of the node comparisons can be made by first ordering the columns in node row by size. As described previously, the nodes may contain a large number of columns, each of varying size and type. Because some of the comparisons may be computationally expensive and the comparisons cease after the detection of pre and post-update columns that are not equal, it may be desirable to compare the smaller and less computationally intensive columns first. Accordingly, the columns are compared starting with the smallest columns until a non-equal column pair is detected.

At 290, the XML index is desirably updated according to the action column of the merged table. For rows in the merged table with an action column marked delete, rows in the XML index with matching node identifiers are desirably removed. Any system, method, or technique for locating and removing rows from a table may be used.

For rows in the merged table with an action column marked insert, new rows are inserted into the XML index corresponding to the post-update node values in the merged table. Any system, method, or technique for inserting rows into a table may be used.

For rows in the merged table with an action column marked update, the corresponding rows in the XML index are desirably located. Once located, the columns comprised in each row are desirably replaced with the columns from the merged table corresponding to the post-update node values. Any system, method, or technique known in the art for locating and updating rows in a table may be used.

Because the tables are merged based on node identifiers, it is desirable to ensure that when nodes are deleted from an XML object, the original node numbering is preserved with respect to the remaining nodes. To facilitate this, certain node identifier information may be retained in the XML instance. This information may comprise the node identifier that should be used for this particular node by the shredder or node identifier generator. When such a node identifier is encountered by the generator, subsequent nodes are desirably numbered relative to the encountered node identifier.

For example, a shredded XML object may comprise nodes 1.1, 1.3, and 1.5. An update on the object may delete the XML tag corresponding to node 1.3. Later, on a subsequent update to the same XML object, the node previously numbered 1.5 will be assigned the node identifier 1.3 when the object is shredded. To avoid this and to preserve the original node numbering, an indicator of a desired node identifier may be stored with the XML object and used by the node identifier generator. Previously, when node 1.3 was deleted, before storing the modified XML object, a tag indicating that the node corresponding to node 1.5, should be assigned the node identifier 1.5 is desirably inserted into the XML object. Later, when the object is re-shredded the tag is encountered by the node identifier generator and subsequent nodes are desirably numbered relative to the specified node identifier.

In a further improvement, the relative offset between the expected node identifier and the desired node identifier may be instead specified. For example, a one may be stored instructing the node identifier generator to skip one sequential node identifier. Where node identifiers are large, this may result in a large savings of disk space.

FIGS. 3*a*-*d* are illustrations of some of the various tables and values generated for an example XML index update in accordance with the invention. For example, consider the following exemplary XML object: TABLE-US-00001 <Book @ISBN="1-55860-190-2" @year="1993"> <Title>Transaction Processing: concepts and techniques</Title> <Author>Jim Gray</Author> </Book>

This XML object may exist in a table, such as the primary table 101 as described with respect to FIG. 1, for example.

Figure 3A:
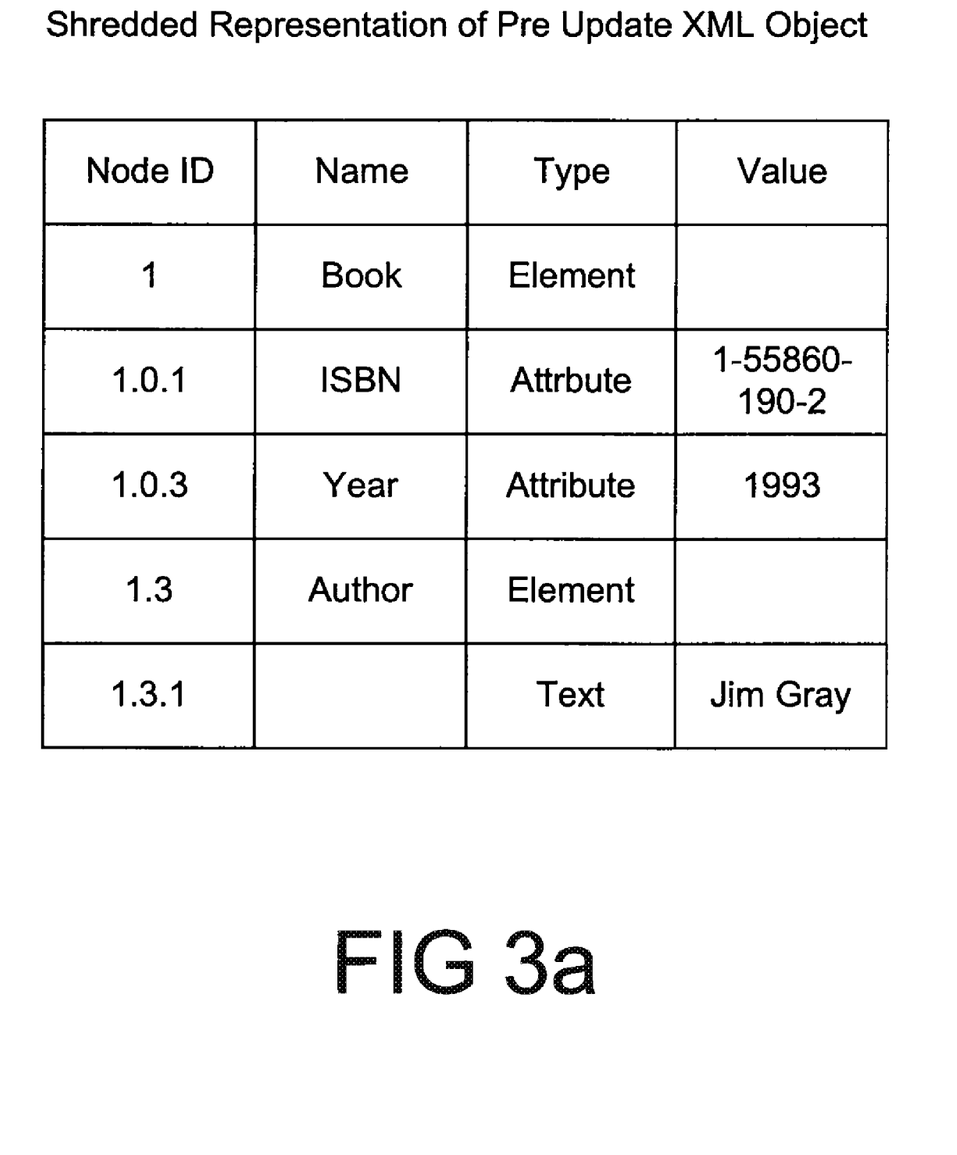
FIG. 3a is an illustration of a pre-update shredded XML object in accordance with the invention.

Similarly, the shredded representation of the XML object may exist in an XML index table. The shredded representation of the XML object is illustrated in FIG. 3*a*, for example.

As described with respect to FIGS. 1 and 2, if a user wishes to make a change or an update to the described XML object, both the actual object in the primary table 101 and the shredded presentation of the object in the XML index table 120 are desirably updated. Because the actual changes made to the XML object are often small, it is desirable that those nodes in the XML index table 120 that are changed be updated. Accordingly, updates to XML objects are desirably processed in accordance with the method described in FIG. 2, such that actual changes to the XML nodes are made to the XML index table 120.

For example, consider an update to the XML object illustrated above adding <Author>Andreas Reuter</Author>. The update will result in the following post-update XML object:

```
<Book @ISBN="1-55860-190-2" @year="1993">
    <Title>Transaction Processing: concepts and techniques</Title>
    <Author>Jim Gray</Author>
    <Author>Andreas Reuter</Author>
</Book>
```

Figure 3B:
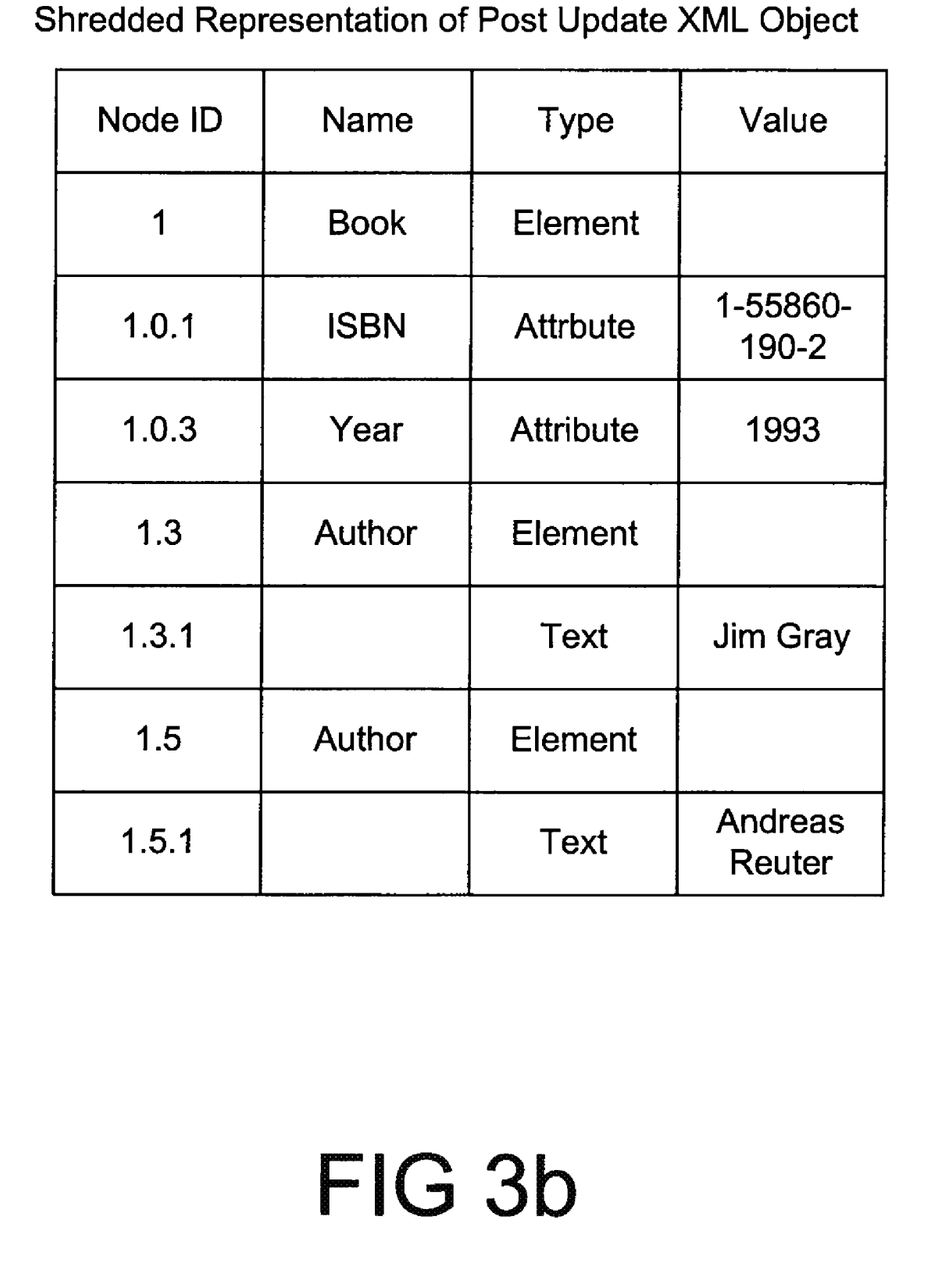
FIG. 3b is an illustration of a post-update shredded XML object in accordance with the invention.

An exemplary shredded representation of the post-update XML object is illustrated in FIG. 3*b*. The post-update version of the XML object has two additional nodes, 1.5 and 1.5.1, corresponding to the addition of the author Andreas Reuter.

Figure 3C:
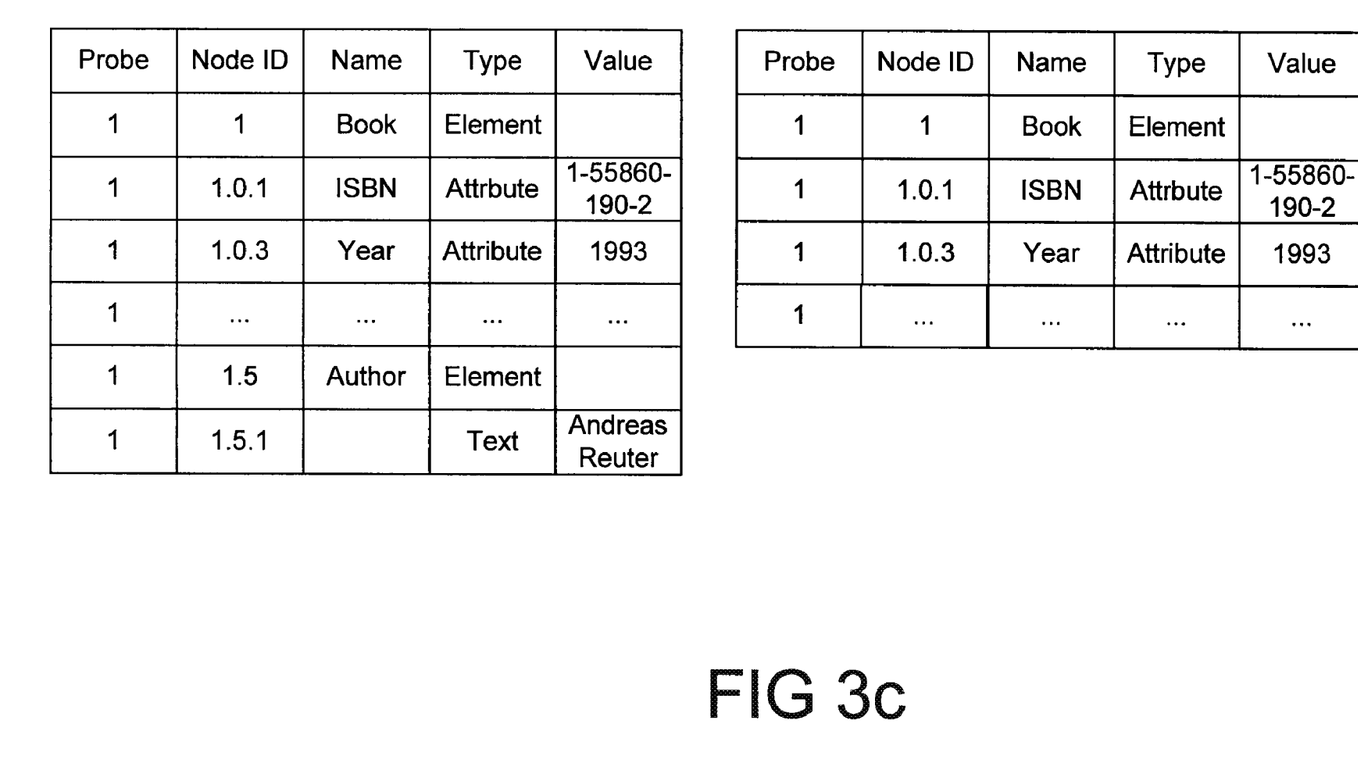
FIG. 3c is an illustration of the pre and post-update shredded XML objects with the addition of a probe column in accordance with the invention.

As described with respect to FIG. 2, the pre-update and post-update versions of the shredded XML objects may be compared to determine which nodes have been changed, added, or deleted as a result of the update. In order to facilitate this comparison, a probe column is desirably created for each of the shredded XML objects. The probe column can be populated using any non-Null value, such as one for example. The shredded XML objects with the corresponding probe columns attached are illustrated in FIG. 3*c*. As shown, the probe column has been appended to the front of each table.

The probe column is used to determine if a particular node was present in either the pre or post-update node table. After merging the pre and post-update tables based on node identifiers into a merged table, any node not present in the pre-update table, but present in the post-update table, will have Null values in the section of the merged table corresponding to the pre-update table, including the probe column. Similarly, any node not present in the post-update table, but present in the pre-update table, will have Null values in the section of the merged table corresponding to the post-update table, including the probe column. In order to quickly determine which nodes were added, deleted, or possibly updated, the probe columns can be referenced for Null values. The requirement that the original probe column values be non-Null is to ensure that any Null values found in the probe columns are the result of the merger, and not the original value assigned to the probe column.

Figure 3D:
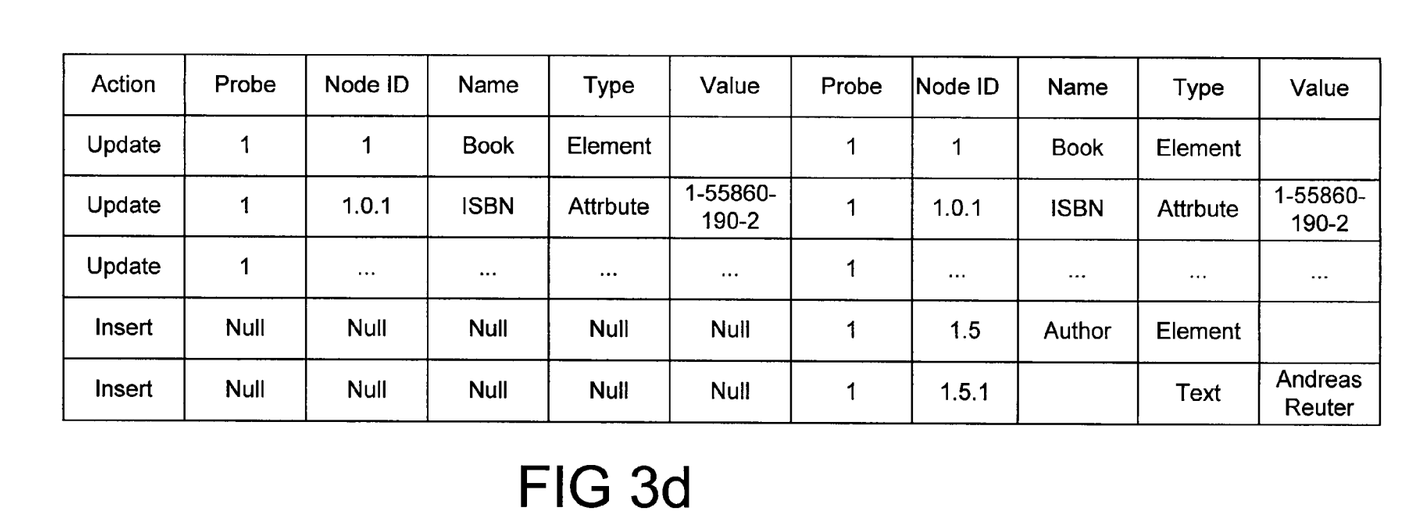
FIG. 3d is an a illustration of a merged pre and post-update table generated from the merge operation in accordance with the invention.

FIG. 3*d* illustrates the resulting merged table formed by a full outer merge between the post-update node table and the pre-update node table using the node identifiers. As shown, nodes 1.5 and 1.5.1 were not present in the pre-update node table, resulting in Null values inserted into the columns associated with the pre-update node table, for example. Also illustrated in FIG. 3*d* is the action column. As described with respect to FIG. 2, the action column was desirably generated with reference to the two probe columns in the merged table, for example. If both probe columns are non-Null, or 1, then the action column for that row is desirably marked 'update'. Marking the action column 'update' indicates that the associated node was present in both the pre and post-update table. As shown in FIG. 3*d*, all rows except rows 1.5 and 1.5.1 have been marked as 'update'.

Rows 1.5 and 1.5.1 have been marked as 'insert' in their respective action columns. Because the probe column associated with the pre-update node table is Null for 1.5 and 1.5.1, those nodes are not present in the XML index table. Accordingly, the node rows are marked as 'insert' to signal to the database engine that they should be inserted into the XML index table.

Before updating the XML index table according to the action columns, the rows with the action column marked 'update' are further analyzed to determine if any node values changed between the pre and post-update node tables. For example, in FIG. 3*d* none of the nodes marked as 'update' were actually changed as a result of the primary table update. To determine which nodes actually changed, and to avoid updating a node that has not changed, the node rows marked 'update' are examined column by column to find any pre and post update column pair that are different. If no such pair is found, then the entire row may be removed from the table. Accordingly, all the rows marked 'update' are removed from the table.

Figure 3E:
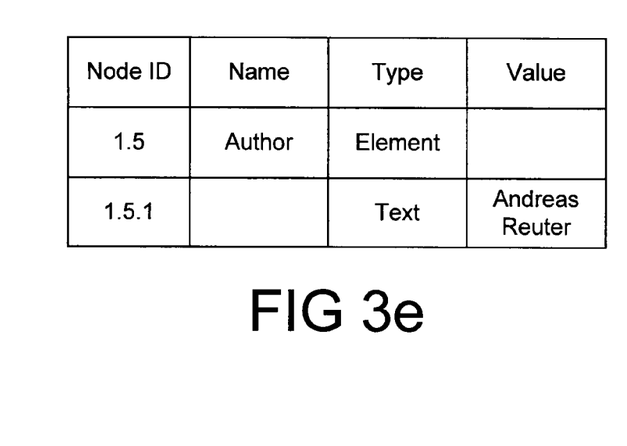
FIG. 3e is an a illustration of the updated node rows for the XML index in accordance with the invention.

FIG. 3*e* illustrates the update that will be made to the XML index table as a result of the original update to the primary table. As shown, after comparing the pre and post update objects, the only change that is made is adding nodes 1.5 and 1.5.1. The update may be made by a database engine, for example. Any system, method, or technique known in the art for updating a database may be used.

Exemplary Computing Environment

Figure 4:
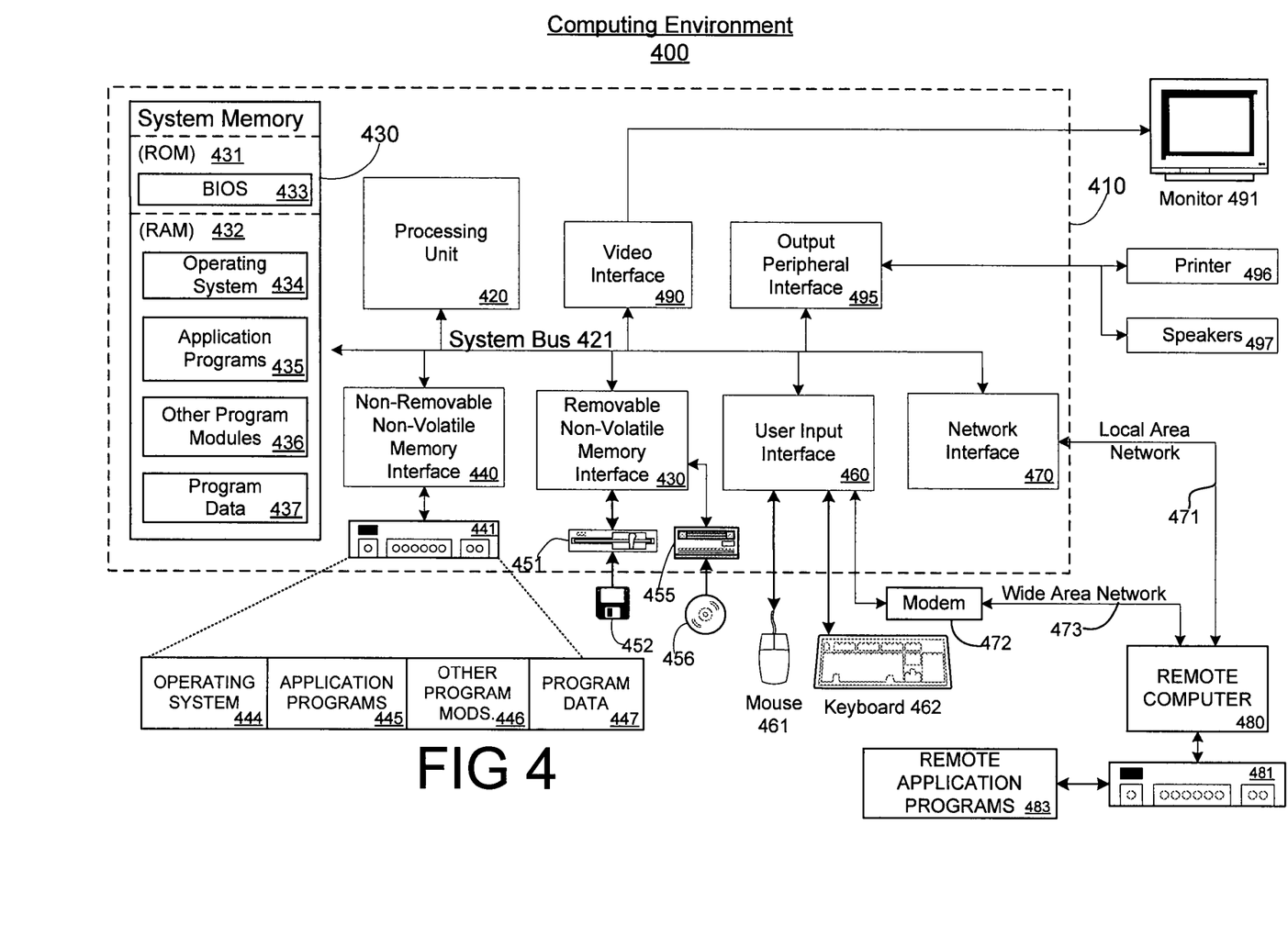
FIG. 4 is a block diagram showing an exemplary computing environment in which aspects of the invention may be implemented.

FIG. 4 illustrates an example of a suitable computing system environment 400 in which the invention may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 4, an exemplary system for implementing the invention includes a general purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 410 typically includes a variety of computer readable media. Computer readable media can be any available media that can be accessed by computer 410 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 410. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 430 includes computer storage media in the form of volatile and/or non-volatile memory such as ROM 431 and RAM 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable, volatile/non-volatile computer storage media. By way of example only, FIG. 4 illustrates a hard disk drive 440 that reads from or writes to non-removable, non-volatile magnetic media, a magnetic disk drive 451 that reads from or writes to a removable, non-volatile magnetic disk 452, and an optical disk drive 455 that reads from or writes to a removable, non-volatile optical disk 456, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted include a LAN 471 and a WAN 473, but may also include other networks. Such networking environments are commonplace in offices, enterprise-wide computer networks, intranets and the internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 483 as residing on memory device 481. It will be appreciated that the network connections shown are exemplary and other means of establishing a communications link between the computers may be used.

As mentioned above, while exemplary embodiments of the invention have been described in connection with various computing devices, the underlying concepts may be applied to any computing device or system.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the invention. Additionally, any storage techniques used in connection with the invention may invariably be a combination of hardware and software.

While the invention has been described in connection with the preferred embodiments of the various figures, it is to be understood that other similar embodiments may be used or modifications and additions may be made to the described embodiments for performing the same function of the invention without deviating therefrom. Therefore, the invention should not be limited to any single embodiment, but rather should be construed in breadth and scope in accordance with the appended claims.

What is claimed:

1. A computer-implemented method for maintaining an XML index table, wherein the XML index table comprises a row entry for every node in an XML object, the method comprising;
  receiving an update to a primary database, the update referencing an XML object;
  updating the primary database according to the update, including the referenced XML object;
  retrieving from the XML index table rows corresponding to the referenced XML object, wherein each row corresponds to a node in the XML object;
  assigning each row at least one node identifier;
  generating a pre-update node table comprising the retrieved rows;
  shredding the referenced XML object in the primary database to extract a post-update node from the referenced XML object;
  generating a post-update node table from the extracted nodes;
  comparing the post-update node table to the pre-update node table to determine which nodes were at least one of deleted, added, or updated from the referenced XML object, wherein comparing the post-update node table to the pre-update node table comprises:
    generating a first probe column for the pre-update node table and a second probe column for the post-update node table, wherein the first and second probe columns comprise non-Null values;
    generating a composite table by performing a full outer merge operation on the pre and post-update node tables by node identifier; and
    for each row in the composite table:
      determining that the node corresponding to the node identifier was added to the referenced XML object if the first probe column in the composite table is Null and the second probe column in the composite table is non-Null;
      determining that the node corresponding to the node identifier was deleted from the referenced XML object if the if the first probe column in the composite table is non-Null and the second probe column in the composite table is Null; and
      determining that the node corresponding to the node identifier was updated in the referenced XML object if the first probe column in the composite table is non-Null and the second probe column in the composite table is non-Null; and
  filtering out unchanged nodes.

2. The method of claim 1, further comprising:
  deleting from the XML index table rows corresponding to nodes which were deleted from the referenced XML object;

adding to the XML index table rows corresponding to nodes which were added to the referenced XML object; and updating rows in the XML index table corresponding to rows which were updated in the reference XML object.

3. The method of claim 1, wherein determining that the node corresponding to the node identifier was updated in the referenced XML object if the first probe column in the composite table is non-Null and the second probe column in the composite table is non-Null further comprises:

comparing each column in the composite table from the pre-update table with the corresponding column in the composite table from post-update table until a column pair is found with unequal values, and determining that the node corresponding to the node identifier was updated in the referenced XML object only if a corresponding column pair with unequal values is found.

4. The method of claim 3, wherein the columns are compared in an order based on the complexity of the column comparisons.

5. The method of claim 3, wherein the columns are compared in an order based on the column size.

6. A computer-readable storage medium storing computer-executable instructions thereon, that when executed by a processor, cause the processor to perform the method of:

receiving an XML object, wherein the XML object comprises a first set of nodes;

retrieving a second set of nodes corresponding to the received XML object from a database, wherein the XML object stores an indicator of an association between each node and a corresponding node identifier that uniquely identifies the node;

merging the first set of nodes to the second set of nodes in a work table;

comparing the first set of nodes to the second set of nodes; filtering out unchanged nodes from said work table; and updating the second set of nodes in the database based on the comparison, wherein the indicator is used to preserve the association between each node and a corresponding node identifier;

wherein comparing the first set of nodes to the second set of nodes comprises:

generating a first probe column for the first set of nodes and a second probe column for the second set of nodes, wherein the first and second probe columns comprise non-Null values;

generating a composite table by performing a full outer merge operation on the first set of nodes and the second set of nodes by node identifier; and for each row in the composite table;

determining that the node corresponding to the node identifier was added to the referenced XML object if the first probe column in the composite table is Null and the second probe column in the composite table is non-Null;

determining that the node corresponding to the node identifier was deleted from the referenced XML object if the first probe column in the composite table is non-Null and the second probe column in the composite table is Null; and determining that the node corresponding to the node identifier was updated in the referenced XML object if the first probe column in the composite table is non-Null and the second probe column in the composite table is non-Null.

7. The computer-readable storage medium of claim 6, wherein comparing the first set of nodes to the second set of nodes comprises computer-executable instructions for:

identifying nodes in the first set of nodes that are not in the second set of nodes;

identifying nodes in the second set of nodes that are not in the first set of nodes; and identifying nodes in the first set of nodes that are in the second set of nodes.

8. The computer-readable storage medium of claim 7, wherein updating the second set of nodes in the database based on the comparison comprises computer-executable instructions for:

adding to the second set of nodes in the database identified nodes in the first set of nodes that are not in the second set of nodes; and deleting from the second set of nodes in the database identified nodes in the second set of nodes that are not in the first set of nodes.

9. A system for maintaining an XML index, the system comprising:

a computing processor;

a storage medium communicatively coupled to said computing processor for storing information, the storage medium comprising:

a primary database that stores a plurality of XML objects, the XML objects comprising a plurality of nodes;

an XML index database that stores a plurality of nodes, the nodes corresponding to XML objects stored in the primary database, wherein each of the XML objects stores an indicator of an association between each node and a corresponding node identifier that uniquely identifies the node; and a database engine that:

receives an update to the primary database;

updates the primary database according to the update;

determines nodes changed, added, or deleted from the XML objects in the primary database as a result of the update;

filters out unchanged nodes; and updates the XML index database to reflect the nodes changed, added, or deleted from the XML objects in the primary database as a result of the update, wherein the indicator is used to preserve the association between each node and a corresponding node identifier;

wherein the database engine determines nodes changed, added, or deleted from the XML objects in the primary database as a result of the update by comparing a post-update node table to a pre-update node table, wherein comparing comprises:

generating a first probe column for the pre-update node table and a second probe column for the post-update node table, wherein the first and second probe columns comprise non-Null values;

generating a composite table by performing a full outer merge operation on the pre and post-update node tables by node identifier; and for each row in the composite table;

determining that the node corresponding to the node identifier was added to the referenced XML object if the first probe column in the composite table is Null and the second probe column in the composite table is non-Null;

determining that the node corresponding to the node identifier was deleted from the referenced XML object if the first probe column in the composite table is non-Null and the second probe column in the composite table is Null; and determining that the node corresponding to the node identifier was updated in the referenced XML object if the first probe column in the composite table is non-Null and the second probe column in the composite table is non-Null; and filtering out unchanged nodes.

10. The system of claim 9, wherein the database engine further:
   retrieves updated XML objects from the primary database;
   extracts the nodes from the retrieved XML objects;
   retrieves the nodes corresponding to the updated XML objects from the XML index database; and
   compares the retrieved nodes with the extracted nodes.

11. A computer-implemented method for maintaining an XML index table having a row entry for every node in an XML object, the method comprising:
   receiving an update to a primary database, the update referencing an XML object;
   updating the primary database according to the received update, including the referenced XML object;
   retrieving from the XML index table rows corresponding to the referenced XML object, wherein each row corresponds to a node in the XML object;
   assigning each row at least one node identifier, wherein the node identifier is created by combining the primary key associated with the XML object with a relative position of the node in the XML object; wherein the referenced XML objects stores an indicator of a desired association between each row and a corresponding node identifier that uniquely identifies the row;
   generating a pre-update node table comprising the retrieved rows, wherein generating the pre-update node table includes generating a pre-update data stream by storing a pre-update value of an XML column in the primary database to a memory buffer and shredding the pre-update value;
   shredding the referenced XML object in the primary database to extract a post-update node from the referenced XML object;
   generating a post-update node table from the extracted nodes, wherein each row comprises a node identifier created by combining the primary key associated with the XML object with a relative position of the post-update node in the XML object, wherein the indicator is used to preserve the association between each row and a corresponding node identifier;
   comparing the post-update node table to the pre-update node table to determine which nodes were at least one of deleted, added, or updated from the referenced XML object; and
   filtering out unchanged nodes.

12. The computer-implemented method of claim 11 wherein comparing the post-update node table to the pre-update node table comprises:
   generating a first probe column for the pre-update node table and a second probe column for the post-update node table, wherein the first and second probe columns comprise non-Null values;
   generating a composite table by performing a full outer merge operation on the pre and post-update node tables by node identifier; and
   for each row in the composite table:
      determining that the node corresponding to the node identifier was added to the referenced XML object if the first probe column in the composite table is Null and the second probe column in the composite table is non-Null;
      determining that the node corresponding to the node identifier was deleted from the referenced XML object if the if the first probe column in the composite table is non-Null and the second probe column in the composite table is Null; and
      determining that the node corresponding to the node identifier was updated in the referenced XML object if the first probe column in the composite table is non-Null and the second probe column in the composite table is non-Null; and
   filtering out unchanged nodes.

\* \* \* \* \*